(12) United States Patent
Danilov et al.

(10) Patent No.: US 12,099,513 B2
(45) Date of Patent: Sep. 24, 2024

(54) ORDERED EVENT STREAM EVENT ANNULMENT IN AN ORDERED EVENT STREAM STORAGE SYSTEM

(71) Applicant: EMC IP Holding Company LLC, Hopkinton, MA (US)

(72) Inventors: Mikhail Danilov, Saint Petersburg (RU); Maksim Vazhenin, Saint Petersburg (RU)

(73) Assignees: EMC IP HOLDING COMPANY LLC, Round Rock, TX (US); DELL PRODUCTS L.P., Round Rock, TX (US)

( * ) Notice: Subject to any disclaimer, the term of this patent is extended or adjusted under 35 U.S.C. 154(b) by 230 days.

(21) Appl. No.: 17/152,558

(22) Filed: Jan. 19, 2021

(65) Prior Publication Data

US 2022/0229845 A1    Jul. 21, 2022

(51) Int. Cl.
*G06F 16/27*    (2019.01)
*G06F 9/54*    (2006.01)
(Continued)

(52) U.S. Cl.
CPC ............... *G06F 16/25* (2019.01); *G06F 9/542* (2013.01); *G06F 16/23* (2019.01); *G06F 16/27* (2019.01)

(58) Field of Classification Search
CPC .......... G06F 16/25; G06F 16/27; G06F 9/542; G06F 11/36; G06F 16/23; G06F 9/25
See application file for complete search history.

(56) References Cited

U.S. PATENT DOCUMENTS 3,617,587 A    11/1971    Nayar et al.
5,826,977 A    10/1998    Fowler et al.
(Continued)

FOREIGN PATENT DOCUMENTS

CA    2 534 170 A1    7/2007
CA    2672879    4/2008
(Continued)

OTHER PUBLICATIONS

Office Action mailed Jul. 8, 2022 for U.S. Appl. No. 16/864,892, 33 pages.
(Continued)

*Primary Examiner* — Marcin R Filipczyk
(74) *Attorney, Agent, or Firm* — Amin, Turocy & Watson, LLP

(57) ABSTRACT

Annulment of events written into an ordered event stream (OES) storage system is disclosed. Events can be written to one or more segments of an OES. An event can be invalid and overwriting the event can be desirable. A stream-cut event can be employed to facilitate annulment of the event via altering a portion of a segment of an OES. The stream-cut event can be durable. Annulment can avoid rewriting an entire stream and/or complicating a stream by adding mitigating events without overwriting invalid events. In an aspect, annulment can comprise moving a write cursor according to a stream-cut event. The annulment can be lossy or lossless. In an embodiment, annulment can be performed in single tier OES storage system. In another embodiment, multi-tier OES storage systems can facilitate annulment.

20 Claims, 10 Drawing Sheets

(51) Int. Cl.
*G06F 16/23* (2019.01)
*G06F 16/25* (2019.01)

(56) References Cited

U.S. PATENT DOCUMENTS

| | | |
|---|---|---|
| 7,107,419 B1 | 9/2006 | Ghemawat et al. |
| 7,340,690 B2 | 3/2008 | Lau |
| 7,430,570 B1 | 9/2008 | Srinivasan et al. |
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer et al. |
| 9,652,307 B1 | 5/2017 | Soman et al. |
| 9,715,434 B1 | 6/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,277,524 B1 | 4/2019 | Kaitha et al. |
| 10,338,834 B1 | 7/2019 | Dighe et al. |
| 10,338,958 B1 | 7/2019 | Kamboj et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1* | 12/2020 | Evenson .......... G06F 11/3495 |
| 10,867,033 B2 | 12/2020 | Kere et al. |
| 10,891,228 B2 | 1/2021 | Burow |
| 10,909,174 B1 | 2/2021 | Martin et al. |
| 10,929,322 B2 | 2/2021 | McDonald et al. |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,347,571 B1* | 5/2022 | Paduroiu .............. G06F 9/542 |
| 11,354,054 B2* | 6/2022 | Danilov .............. G06F 3/0643 |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0037549 A1 | 2/2008 | Haardt et al. |
| 2008/0059724 A1 | 3/2008 | Stifter, Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2013/0290598 A1 | 10/2013 | Fiske et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0270343 A1 | 9/2014 | Sanaullah et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0091570 A1 | 3/2017 | Rao et al. |
| 2017/0123655 A1 | 5/2017 | Sinclair et al. |
| 2017/0147494 A1 | 5/2017 | Andre et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2017/0374147 A1 | 12/2017 | McNair et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0046037 A1* | 2/2019 | Ramesh .............. G16H 50/20 |
| 2019/0057138 A1 | 2/2019 | Knowles et al. |

(56) References Cited

U.S. PATENT DOCUMENTS

| | | |
|---|---|---|
| 2019/0065246 A1 | 2/2019 | Senapaty et al. |
| 2019/0129806 A1 | 5/2019 | Hsu et al. |
| 2019/0138494 A1 | 5/2019 | Inoue |
| 2019/0197173 A1 | 6/2019 | Tahara et al. |
| 2019/0220671 A1 | 7/2019 | Slipenchuk |
| 2019/0278849 A1 | 9/2019 | Chandramouli et al. |
| 2019/0327297 A1 | 10/2019 | Madani |
| 2019/0332318 A1* | 10/2019 | Gooding .............. G06F 3/0656 |
| 2019/0340180 A1 | 11/2019 | Barsness et al. |
| 2019/0349422 A1 | 11/2019 | Dhruvakumar |
| 2019/0392866 A1 | 12/2019 | Yoon et al. |
| 2020/0034468 A1* | 1/2020 | Lei ..................... G06F 16/2456 |
| 2020/0089420 A1 | 3/2020 | Sharoni et al. |
| 2020/0174695 A1 | 6/2020 | Bazarsky et al. |
| 2020/0242103 A1 | 7/2020 | Paduroiu |
| 2020/0250172 A1 | 8/2020 | Busjaeger et al. |
| 2020/0310686 A1 | 10/2020 | Truong et al. |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0084318 A1 | 3/2021 | Kuo et al. |
| 2021/0110328 A1 | 4/2021 | Hsiao et al. |
| 2021/0124746 A1 | 4/2021 | Klaedtke |
| 2021/0157520 A1 | 5/2021 | Bavishi et al. |
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |
| 2021/0374021 A1 | 12/2021 | Santhakumar et al. |
| 2022/0035533 A1 | 2/2022 | Danilov et al. |
| 2022/0182724 A1 | 6/2022 | Gupta et al. |
| 2022/0248090 A1 | 8/2022 | Dhiman et al. |
| 2022/0326878 A1 | 10/2022 | Paduroiu |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

Office Action mailed Jul. 15, 2022 for U.S. Appl. No. 16/864,905, 77 pages.

Office Action mailed Sep. 1, 2022 for U.S. Appl. No. 16/944,094, 25 pages.

Office Action mailed Jul. 21, 2022 for U.S. Appl. No. 17/070,029, 68 pages.

Notice of Allowance mailed Aug. 24, 2022 for U.S. Appl. No. 17/152,544, 55 pages.

Office Action mailed Sep. 15, 2022 for U.S. Appl. No. 17/383,425, 61 pages.

Phaujdar, "Understanding Event Streams—A Comprehensive Guide 101_ Learn Hevo" [https://hevodata.com/learn/understanding-event-streams/] (Feb. 17, 2021) (Year: 2021).

Dhanushka, "Understanding Kafka Topic Partitions" [https://medium.com/event-driven-utopia/understanding-kafka-topic-partitions-ae40f80552e8]—(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).

Office Action mailed Sep. 30, 2022 for U.S. Appl. No. 17/408,344, 66 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Office Action dated Jan. 29, 2021 for U.S. Appl. No. 16/256,083, 42 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Office Action dated Oct. 1, 2021 for U.S. Appl. No. 17/127,724, 41 pages.

Office Action dated Nov. 10, 2021 for U.S. Appl. No. 16/944,089, 75 pages.

Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.

Office Action dated Jan. 21, 2022 for U.S. Appl. No. 16/864,892, 26 pgs.

Notice of Allowance dated Feb. 24, 2022 for U.S. Appl. No. 17/038,079, 55 pgs.

Azhar et al., Efficient selection of access control systems through multi criteria analytical hierarchy process, IEEE, doi: 10.1109/ICET.2012.6375419, pp. 1-8, 2012, 8 pgs.

(56) References Cited

OTHER PUBLICATIONS

Rox et al., Construction and Deconstruction of Hierarchical Event Streams with Multiple Hierarchical Layers, IEEE, doi: 10.1109/ECRTS.2008.13, pp. 201-210, 2008, 10 pgs.
Notice of Allowance dated Feb. 18, 2022 for U.S. Appl. No. 17/083,145, 70pgs.
Notice of Allowance dated Dec. 15, 2021 for U.S. Appl. No. 17/064,747, 54 pages.
Notice of Allowance dated Feb. 4, 2022 for U.S. Appl. No. 16/915,762, 57 pages.
Office Action dated Mar. 21, 2022 for U.S. Appl. No. 16/864,905, 125 pgs.
Muskardin et al., Implementation of Hashing Algorithms in Stream Mining, International Conference on Smart Systems and Technologies (SST), pp. 233-238, 2018, 6 pgs.
Notice of Allowance mailed Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).
Office Action mailed Apr. 20, 2022 for U.S. Appl. No. 16/944,094, 48 pages.
Office Action mailed Apr. 12, 2022 for U.S. Appl. No. 17/038,102, 48 pages.
Notice of Allowance mailed Apr. 27, 2022 for U.S. Appl. No. 17/127,724, 19 pages.
Office Action mailed May 24, 2022 for U.S. Appl. No. 17/237,535, 62 pages.
Non-Final Office Action received for U.S. Appl. No. 17/063,906, dated Oct. 27, 2022, 59 pages.
Notice of Allowance received for U.S. Appl. No. 16/864,905, dated Nov. 30, 2022, 347 pages.
Tony Tung et al., "Topology Dictionary for 3D Video Understanding", IEEE Transactions on Pattern Analysis and Machine Intelligence ( vol. 34, Issue: 8, Aug. 2012), Dec. 2011, pp. 1645-1657.
A. Bulut et al., "Distributed data streams indexing using content-based routing paradigm", 19th IEEE International Parallel and Distributed Processing Symposium, Apr. 2005, pp. 1-10.
Notice of Allowance received for U.S. Appl. No. 17/070,029, dated Dec. 2, 2022, 36 pages.
Non-Final Office Action received for U.S. Appl. No. 17/223,263, dated Nov. 28, 2022, 64 pages.
Non-Final Office Action received for U.S. Appl. No. 17/337,940, dated Dec. 30, 2022, 68 pages.
Notice of Allowance mailed Nov. 15, 2022 for U.S. Appl. No. 16/864,892, 48 pages.
Notice of Allowance mailed Nov. 23, 2022 for U.S. Appl. No. 17/408,344, 35 pages.
Notice of Allowance mailed Nov. 17, 2022 for U.S. Appl. No. 16/944,094, 23 pages.
Notice of Allowance received for U.S. Appl. No. 17/063,906, dated Feb. 6, 2023, 29 pages.
Notice of Allowance received for U.S. Appl. No. 17/383,425, dated Feb. 1, 2023, 37 pages.
Office Action dated Feb. 10, 2023 for U.S. Appl. No. 17/145,588, 78 pages.
Non Final Office Action received for U.S. Appl. No. 17/976,574 dated Mar. 2, 2023, 55 pages.
Notice of Allowance received for U.S. Appl. No. 17/337,940 dated Mar. 1, 2023, 70 pages.
Notice of Allowance received for U.S. Appl. No. 17/223,263, dated Apr. 6, 2023, 32 pages.
Non Final Office Action received for U.S. Appl. No. 18/164,744 dated Aug. 31, 2023, 46 pages.
Notice of Allowance received for U.S. Appl. No. 17/976,574, dated Jul. 6, 2023, 41 pages.
Non-Final Office Action received for U.S. Appl. No. 17/503,024, dated Jun. 23, 2023, 87 pages.
Notice of Allowance received for U.S. Appl. No. 17/145,588, dated Aug. 7, 2023, 28 pages.
Notice of Allowance received for U.S. Appl. No. 18/164,744 dated Dec. 28, 2023, 81 pages.
Non-Final office action received for U.S. Appl. No. 17/228,611 dated Dec. 11, 2023, 70 pages.
Non-Final office action received for U.S. Appl. No. 17/237,517 dated Nov. 27, 2023, 117 pages.
Final office action received for U.S. Appl. No. 17/503,024 dated Dec. 1, 2023, 98 pages.
Notice of Allowance received for U.S. Appl. No. 17/145,588, dated Oct. 18, 2023, 6 pages.
Notice of Allowance received for U.S. Appl. No. 18/164,744, dated Jan. 11, 2024, 12 pages.
Notice of Allowance received for U.S. Appl. No. 18/164,744, dated Jan. 26, 2024, 8 pages.
Notice of Allowance received for U.S. Appl. No. 17/237,517, dated Feb. 28, 2024, 90 pages.
Notice of Allowance received for U.S. Appl. No. 17/503,024, dated Feb. 23, 2024, 62 pages.
Notice of Allowance received for U.S. Appl. No. 18/164,744, dated Mar. 19, 2024, 7 pages.
Notice of Allowance received for U.S. Appl. No. 17/228,611, dated Mar. 22, 2024, 20 pages.
Notice of Allowance received for U.S. Appl. No. 17/228,611, dated May 8, 2024, 6 pages.
Notice of Allowance received for U.S. Appl. No. 17/237,517, dated Mar. 13, 2024, 51 pages.
Notice of Allowance received for U.S. Appl. No. 17/503,024, dated Mar. 13, 2024, 35 pages.
Notice of Allowance received for U.S. Appl. No. 17/503,024, dated Apr. 3, 2024, 48 pages.

* cited by examiner

ORDERED EVENT STREAM EVENT ANNULMENT IN AN ORDERED EVENT STREAM STORAGE SYSTEM

TECHNICAL FIELD

The disclosed subject matter relates to data storage and, more particularly, to ordered event stream (OES) event annulment in an OES of an OES storage system.

BACKGROUND

Conventional data storage techniques can employ an event stream, e.g., storing data corresponding to stream events in a logical order. In a conventional system, an event stream can provide for storing a generally unbounded stream of events whereby a portion of the stored events can then be read out in the order they were stored. One use of data storage is in bulk data storage.

DETAILED DESCRIPTION

Figure 1:
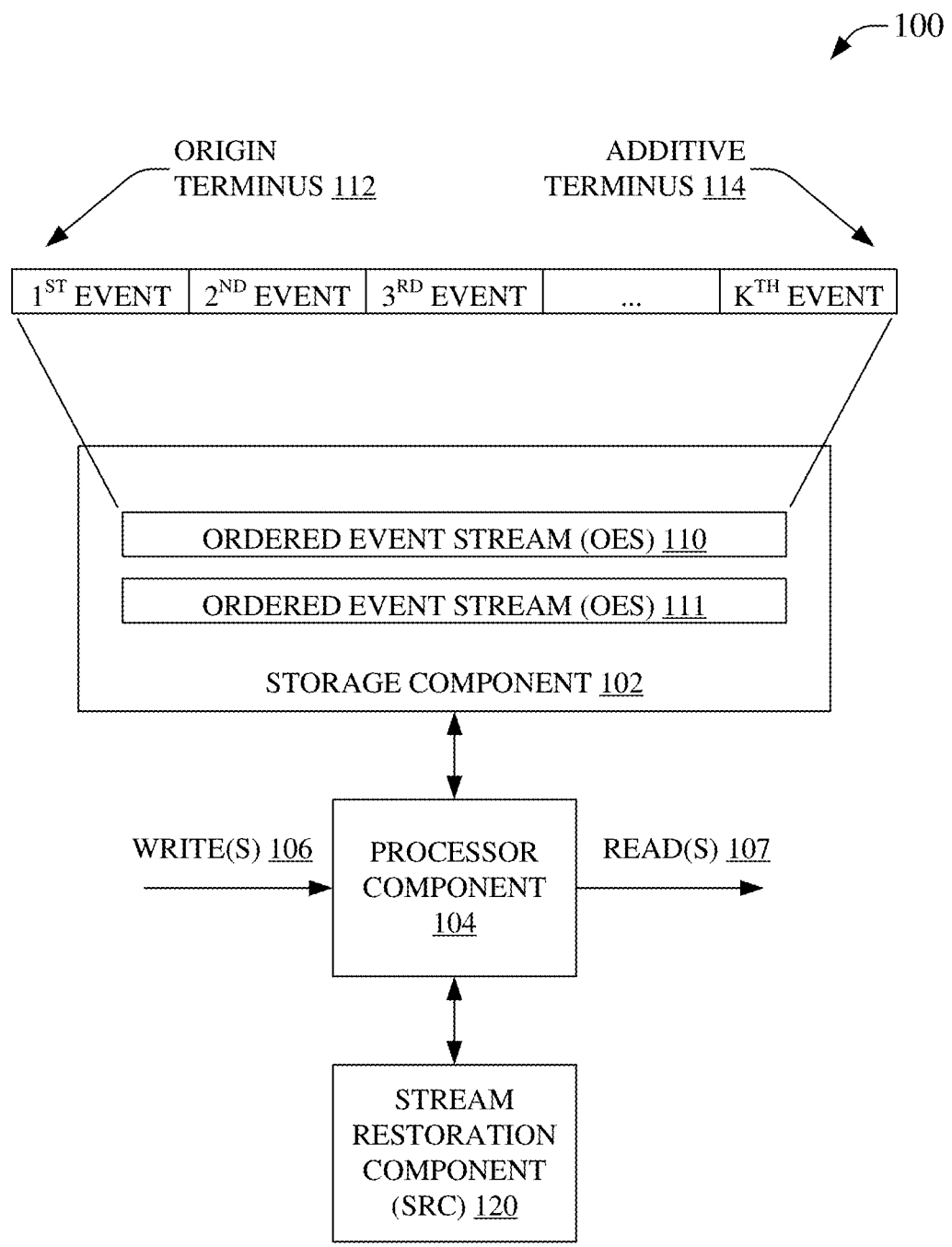
FIG. 1 is an illustration of an example system that can facilitate annulling storage of an event in an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In general, an ordered event stream (OES), or a 'stream' for convenience, can be a durable, elastic, append-only, unbounded sequence of events. An example of an ordered event streaming storage system can be STREAMING DATA PLATFORM by DELL EMC. An event can be added to a head of a stream of events, e.g., a first event can be considered at a tail of an event stream and a most recent event can be regarded as being at the head of the stream with other events ordered between the tail and the head of the stream. The events need not be stored in contiguous storage locations to be logically sequenced in the stream representation of physical storage, e.g., a first event can be stored on a first disk, a second event on a remotely located second disk, and a third event stored at a further remote third disk, the stream can logically sequence the first, second, and third events by reference to their stored data in different physical locations, the OES can be regarded as an abstraction of physical storage that can store the events in an ordered manner, etc. It is noted that some stream systems, e.g., PRAVEGA by DELL EMC, etc., can employ an alternate head/tail terminology, for example, in PRAVEGA a first event can be added at a head of an OES, while subsequent new events can then be added to a tail of the OES, however, this is indistinguishable in all other aspects from the head/tail convention generally employed in the instant disclosure. Every event of the stream can be associated with a routing key, or simply a 'key' for convenience. A key can often be derived from data corresponding to the event, e.g., a "machine-id," "location," "device type," "customer number," "vehicle identifier," etc. In an aspect, an event can be associated with a key, however, data yet to be written to an event can be associated with a access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, an access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a 'key value' such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key unless more specificity is needed in some given example, and this convention is generally used in the instant disclosure for simplicity and brevity, as an example, a key can be determined when an event is stored, e.g., the event is stored according to the key, such that a read instruction for events of 'the key' can return event(s) stored according to the key. Events with the same routing key can be written to a corresponding stream or stream segment, and can also be consumed, e.g., read, in the order they were written to the stream or stream segment.

In an aspect, an OES can comprise one or more stream segments. A segment of an event stream can generally be associated with a single processing instance to assure ordering of the events logically added to the segment. A processing instance can be a single real physical processor, a virtualized processor executing on one or more real physical processors, a group of real physical processors, a group of virtual processors executing on one or more real physical processors, etc. As an example, a processing instance can be a blade server of a rack system. As another example, a processing instance can be a virtual processor deployed in an elastic computing system, e.g., a 'cloud server,' etc. Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed per unit time by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support or manpower costs, real estate for deployment costs, etc. As such, selecting an appropriate processing instance can be associated with optimizing cost(s). As an example, if an event stream consumes less than one unit of work, then pairing the stream with a processing instance that can perform one unit of work can be a more optimal use of computing resources, e.g., lower overall aggregate costs, etc., than pairing the event stream with a processing instance that can perform 200 units of work which can result in 'wasting' up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a race car of a performance instance can be understood as possibly not being an optimal pairing in comparison to a more pedestrian performance instance.

Where an OES can be comprised of one or more portions, e.g., segments, shards, partitions, pieces, etc., that can generally be referred to as segments for convenience, a segment of an OES can act as a logical container for one or more events within the OES. When a new event is written to a stream, it can be stored to a segment of the stream based on a corresponding event routing key. An event routing key can be hashed with other event routing keys to form a "key space". The key space can be employed to 'divide' the stream into a number of parts, e.g., segments. In some embodiments, consistent key hashing can be employed to assign events to appropriate segments. As an example, where a stream comprises only one segment, all events to be written to the stream can be written to the same segment in an ordered manner and the only one segment can correspond to the entire key space. As another example, where a stream comprises two segments, the key space can be associated with the two segments, e.g., the total key space can extend from zero to 'n', however each of the two segments can be associated with a portion of the total key space, for example, the first segment can be employed to store events with a key between zero and 'm' and the second segment can be employed to store events with a key between 'm+1' and 'n'. It will be appreciated that more segments can be employed to further divide the key space such that a segment can store an event with a key falling within the range of the key space associated with that segment. As an example, a four segment OES can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0, etc. Other example divisions of the key space in this example, such as asymmetric division of the key space, etc., are readily appreciated and are not further recited for the sake of clarity and brevity.

Moreover, an OES stream can have a topology that evolves. An evolution of an OES topology can be related to different epochs. As an example, an OES can initially have a first segment, but where writing of events increases above a threshold level, the OES can be scaled to comprise two segments, e.g., a second segment and a third segment. In an aspect, each of the second and third segments can employ a separate processor instance to write events, e.g., scaling the OES can correspond to an increase in the count of processors writing events to the OES. Accordingly, a hashed key space can be divided to encompass the second and third segments of the scaled OES, e.g., the example OES can initially have the first segment covering a key space of 0 to 1, and after the scaling, the second segment can cover events from zero up to 0.25 of the key space and the third segment can cover events from 0.25 to 1 of the key space. The example scaling of the OES can constitute an 'epoch change', e.g., evolution of the topology of the OES, such that before the scaling the OES had the first segment in a first epoch, e.g., 'Epoch 1', and, after the scaling, the OES can have a second and third segment in a second epoch, e.g., 'Epoch 2'. In an aspect, the first segment can be closed at the change in epoch, and thereby, the second and third segments can correspondingly be opened at the epoch change. In this way, in Epoch 1 there is one segment for all of the key space zero to one and, in Epoch 2, there are two segments, each covering a portion of the total key space. In an aspect, storage schemes can be different in different epochs, e.g., the topology change of the OES can result in a change in storage scheme. Returning to the above example, reading an event with a key space value of 0.75 in the first epoch can read from the first segment and can be distinct from reading another event with a key space value of 0.75 in the second epoch that would read from the third segment. The use of different storage schemes for events of an OES, e.g., an OES having different OES segment schemes across epochs of an OES, can be associated with reading out OES events according to those different storage schemes in their corresponding epochs.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store events having 'y' between 0.1 and 0.5, e.g., $0.1 \leq y < 0.5$, and the seventh segment can store events having 'y' between 0.5 and 1, e.g., $0.5 \leq y < 1$.

Generally, changes to an OES storage scheme, e.g., an epoch change, etc., can be in response to an indication that computing resources transition a level of burden, e.g., where a processor becomes burdened, another processor can be added and the key space can be divided between the increased number of processors in a new epoch. An event stream can be divided, symmetrically or asymmetrically, to increase an amount of computing resources available to each segment of an OES. As an example, if an initial event stream causes a load of two units of work for a first processor, and the two units of work load correspond to an even distribution of work across the associated key space of the initial event stream, and the two units of work can exceed a threshold work level of the example first processor, then the stream can be split into two segments and a second processor can be added. In this example, after the scaling of the stream, the first processor can now support a second segment, in lieu of the initial one segment, at about one unit of work and a third segment can be supported by the second processor, also at about one unit of work, assuming the work load from the initial stream was roughly evenly split between the key spaces of the new epoch.

Transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that would be at a local time of 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme and a change in OES storage epochs, etc.

As stated elsewhere herein, an OES can generally store events in an append-only format, e.g., events are iteratively added to an additive terminus resulting in an ordered stream of events. In an aspect, this ordered stream of events can comprise events that can be inappropriate to store. An event can be determined to be inappropriate based on designated criteria. As an example, a criteria can be that the event comprises data that is accurate, that is generated correctly, that is within designated bounds, etc. An example of an inappropriate event can be an event storing data sourced from a malfunctioning sensor, e.g., the data of the event can be written correctly but can be inaccurately generated by the sensor. Another example of an inappropriate event can be event data that is corrupted, e.g., a sensor can generate correct event data that can be corrupted and written into a stream, such as signal lines experiencing electromagnetic interference that corrupts an otherwise accurate measurement to be stored in an OES, etc. It can be desirable to annul an OES to remove inappropriate events. However, in conventional stream systems, annulling can typically be via either copying events into a new stream in a manner that removes inappropriate events, or by adding additional events to the existing stream to ameliorate the effect of the continued storage of an inappropriate event(s). Where appropriate events are copied to a new stream, there can be an increasing computing resource burden correlated to a stream size, e.g., selective duplication of appropriate events of streams with many events can be highly computing resource intensive. As an example, the new stream solution for a stream with 1,000,000 events comprising 1600 events in the last 10,000 event writes can consume computing resources to copy the first 990,000 events from the old stream to the new stream and then filtering the last 10,000 events to weed out the 1600 inappropriate events when selectively duplicating the remaining good events to the new stream. Where appropriate events are mitigated by writing new events to an existing stream, the resulting stream can still comprise the inappropriate events, leading to unnecessary complexity in the stream. As an example, for a stream with 10,000 events and 9,000 inappropriate events, adding additional events to indicate with of the 10,000 events are inappropriate still leaves the stream with those 9,000 inappropriate events. Accordingly, in this example, reading from the stream can then consume computing resources to read inappropriate events which can then be ignored based on the additional mitigating events added to the stream. However, in this example, it can be appreciated that it can be less complicated and more computing resource efficient to not read the inappropriate events at all. As such, improvements to conventional streams storage of inappropriate events, e.g., annulment of inappropriate events, can be desirable.

In an aspect, an OES storage system can employ a stream-cut event, hereinafter a 'cut,' 'cut event,' etc., that can be an event indicating a progress position in the stream at an event boundary. In an aspect, cut events can be stored via a segment of an OES, e.g., corresponding to a stream-cut event key. A stream-cut event can indicate a progress position that can go through one or more segments of a stream, e.g., a first cut can indicate a progress position applicable to some, none, or all segments of a stream. In an aspect, a cut event can be generated automatically based on a selectable or determinable input value. In an aspect, stream-cuts can be employed for operations such as framing read operations, stream truncation operations, etc., although such other uses are not disclosed herein for the sake of clarity and brevity. In an aspect, the instant disclosure can employ stream cut events to enable annulling of events of a segment of a stream.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate annulling storage of an event in an ordered event stream, in accordance with aspects of the subject disclosure. System 100 can comprise a storage component 102 that can store an ordered event stream (OES) 110, 111, etc., which can store representations of, reference to, etc., an event. An OES can store one or more events. An event can be associated with a key, e.g., a routing key. A key can typically be determined from an aspect or characteristic of, or corresponding to, an event, although other key determination techniques can be employed. As an example, a key can be based on a characteristic of the source of the event data, such as a customer identifier, machine identifier, a location of a device providing the event data, a type of a device providing the event data, etc. Events can be written to an OES in an ordered manner according to a key, e.g., events with a same key can be written to a same potion, e.g., segment, etc., of an OES in an ordered manner. Similarly, events can be read from an OES, generally in an ordered manner, according to a key, e.g., typically in the order in which they were previously written into a portion of an OES. A component(s) providing data for events to be written can be termed a 'writer(s),' e.g., a writer application instance, etc., and a component(s) requesting data from events can be termed a 'reader(s),' e.g., a reader application instance, etc. As such, a writer can provide data for an event that can be written to a portion of an OES, e.g., OES 110, 111, etc., in an ordered manner based on a key associated with the event. Similarly, a reader can receive data from an event stored in a portion of an OES, e.g., OES 110, 111, etc., based on a key.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, etc., can be designated for writing events to a portion, e.g., segment, of OES 110, 111, etc. OES 110, 111, etc., can comprise one segment and/or parallel segments that can store events according to a key. In an aspect, more than one processing instance writing to a segment of an OES, while allowable in some embodiments, is typically disfavored because it can increase the difficulty of writing incoming events in a properly ordered manner. However, a given processing instance can read, write, etc., to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances can generally be left idle to avoid possible scrambling of an order of events being written to a segment. It is further noted that idle processing instances, where comprised in system 100, for example, can act as reserve processing instances, such as to allow for failover where an active processing instance becomes less responsive, etc. In an aspect, keys of one or more segments of an OES can represent a key space for OES 110, 111, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, as illustrated in system 100, can be a simplistic example of an OES that can comprise just one segment for storing incoming event write(s) 106 and sourcing event read(s) 107, and therefore the key space of OES 110 can be embodied in an example single segment with events that can have an origin terminus 112. A first event can be written at origin terminus 112. Subsequent events can then be appended at an additive terminus 114 that is typically at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., strings of events for a defined key space range. Each segment can comprise an ordered sequence of stored events. The key space of an OES can evolve, e.g., through different epochs, to comprise different numbers of OES segments as is disclosed elsewhere herein. The key space can be symmetrically or asymmetrically divided and can be, but is not required to be, contiguous.

In system 100, stream restoration component (SRC) 120 can facilitate annulment of events written to a stream, e.g., a stream can be altered to remove an event. In an aspect, a stream cut event for a stream can be used to indicate a position in the stream. Moreover, additive terminus 114 can indicate where a next event is to be added to the stream, this position can be termed a 'write cursor,' e.g., a new event can be written at the write cursor. SRC 120 can enable repositioning of the write cursor, e.g., repositioning of additive terminus 114. In an aspect, SRC 120 can reposition the write cursor to be incident with a position indicated by a stream-cut event, which can be indicated by the shorthand phrase, " . . . the write cursor can be moved to the stream-cut." It is noted that it is more accurate to say the write cursor is moved to a position indicated by the stream-cut event, however this phrasing is verbose and the shorthand phrase can be generally be understood to portray the more accurate meaning unless explicitly indicated otherwise. In an aspect, SRC 120 moving the write cursor to a stream cut can result in new stream events being written from the stream cut. This moving of the write cursor can result in overwriting stream events. As an example, moving a write cursor from the 10th event to the end of the 5th event can result in writing an 11th event as the 6th event. In this example, where the 6th event was an inappropriate event, the overwriting can be acceptable. Moreover, in this example, a 12th event can then be written subsequent to the 11th event and can, for example, overwrite a 7th event. However, where the 7th event can have been an appropriate event, the overwriting can destroy an event that would typically be otherwise preserved. Accordingly, in an embodiment, movement of the write cursor can be followed with preservation of valid events, e.g., appropriate events, by reading events from the stream cut forward and preserving valid events in the stream. In an aspect, this can result in shifting of valid events to overwrite inappropriate events. Additionally, new events can then be written to eh stream subsequent to the compacted portion of the stream, as is disclosed in more detail herein below.

Figure 2:
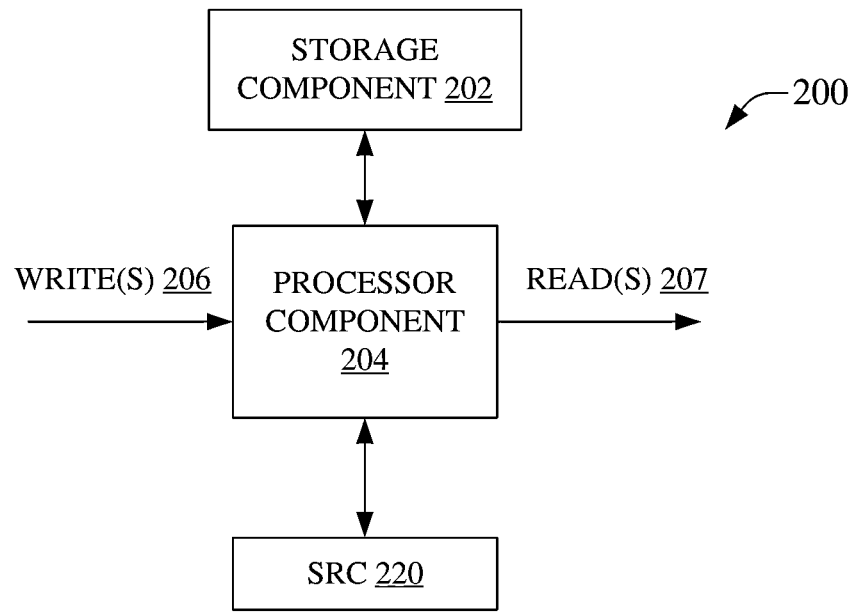
FIG. 2 is an illustration of an example system enabling annulling storage of an event from one or more segments of an ordered event stream, in accordance with aspects of the subject disclosure.
Figure 2:
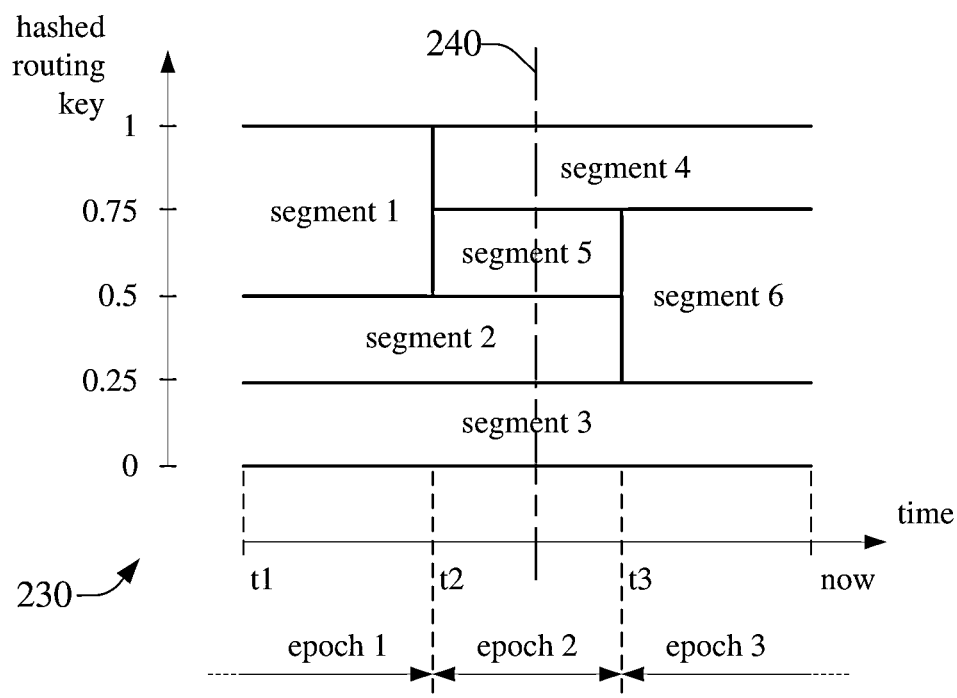

FIG. 2 is an illustration of an example system 200 enabling annulling storage of an event from one or more segments of an ordered event stream, in accordance with aspects of the subject disclosure. System 200 can comprise a storage component 202 that can store an OES that can store one or more events according to a routing key that can be determined from aspects of the event. Events can be written to an OES in an ordered manner, e.g., via write(s) 206, and can be read from the OES in an ordered manner, e.g., via read(s) 207. In an aspect, keys of one or more segments of an OES can represent a key space. Segments can therefore act as logical containers associated with a particular range of keys for an event stream and can be used to store events within an OES.

Ordered event stream system 200 can comprise segments. At a first time, for example at t1 of 230, OES system 200 can comprise one or more parallel segments, e.g., segment 1, segment 2, segment 3, etc. At some point a segment can be scaled. As an example, at t2 of 230, segment 1 can be scaled up. This can result in causing segment 4 and segment 5 and correspondingly sealing segment 1. The topology of the OES, illustrated at 230, comprising segments 1-3 pre-scaling can be designated as epoch 1. Similarly, the topology of the OES comprising segments 4-5 and 2-3 can be designated as epoch 2, also as illustrated at 230.

In an aspect, segments 2 and 3 can be continuous across epochs 1 and 2, while segment 1 can end at the transition from epoch 1 to 2. In an aspect, in epoch 1, events associated with a key between 0.5 and 1, e.g., $0.5>key \geq 1$, can be written (and read from) segment 1, while in epoch 2, events associated with a key between 0.75 and 1, e.g., $0.75>key \geq 1.0$, can be written (and read from) segment 4 and events associated with a key between 0.5 and 0.75, e.g., $0.5>key \geq 0.75$, can be written (and read from) segment 5. As such, access to events for a given key can be associated with reads in different epochs. As an example, reading an event with a key of 0.8 can read from both segment 1 and segment 4. Where the read can be from head to tail, the read of example events with a key of 0.8 can begin reading in segment 4 and then continue reading into segment 1 across the epoch boundary between epoch 2 and 1. Similarly, where the read can be from tail to head, events associated with the example key of 0.8 can begin in segment 1 and continue into segment 4 across the epoch boundary. However, it is noted that generally no additional events can be written into segment 1 after the scaling event is committed and a new epoch is begun.

In epoch 2, at 230, the topology of OES system 200 can comprise segments 4-5 and 2-3. Further scaling can be later undertaken, e.g., at t3 of 230. OES system 200 can, for example, scale down by condensing segment 2 and 5 into segment 6 at t3, that is, segments 2 and 3 can be sealed and segment 6 can be created. This example scaling down can reduce a count of segments comprising OES system 200. The scaling at t3 of 230 can result in ending epoch 2 and beginning epoch 3. As such, in epoch 3, the topology of the OES comprising segments 3-4 and 6 post-scaling in 230 can distribute the key space of OES system 200, for example, as $0 \leq segment\ 3 > 0.25$, $0.25 > segment\ 6 \geq 0.75$, and $0.75 > segment\ 4 \geq 1.0$.

In system 200, SRC 220 can facilitate annulling an event(s) of one or more segments of an OES stored via storage component 202. In an aspect, SRC 220, as shown in 230, can employ stream-cut event 240 as 'restore point' to which a write cursor can be moved. In an aspect, moving a write cursor from 'now' of 230 to cut 240 can result in writing a next event into a segment of the OES at cut 240, for example writing a new event into segment 4, 5, 2, 3, etc., rewriting an existing event, typically a valid event, back into a segment of the OES, etc. In an aspect, rewriting an event can embody not overwriting an existing event. As an example, where a first event is written at 240 with subsequent events being thereafter written up to 'now' in 230, then in this example, moving the write cursor back to 240 from 'now' can be followed by ascertaining that the first event is a valid event, such that rewriting can either entail actually rewriting the event at 240 or can entail acknowledging that the first event is valid and advancing the write cursor past the first event, thereby embodying rewriting by not overwriting rather than actually overwriting a new event that can be the same as the first event over the first event. In an aspect, SRC 220 can employ stream-cut event(s) generated by other components of system 200, in communication with system 200, or combinations thereof, for example, a stream-cut event generated by processor component 204, etc., whether or not said stream-cut event is generated for explicit use by SRC 220. As such, SRC 220 can employ a stream-cut event generated, for example for use in framing read operations, etc. In an aspect, SRC 220 can generate a stream-cut event(s) that can be employed by SRC 220, other components of OES storage system 200, or combinations thereof. As an example, SRC 220 can generate a stream-cut event that can be employed by another component of system 200, for example, to truncate a stream, etc. In an aspect, a stream can comprise one or more stream cut events. In an aspect, a stream-cut event can be persistent, e.g., can continue to exist even after being used, for example, a stream-cut event can be used to annul events more than once, e.g., a write cursor can be moved based on the same stream-cut event more than once.

Figure 3:
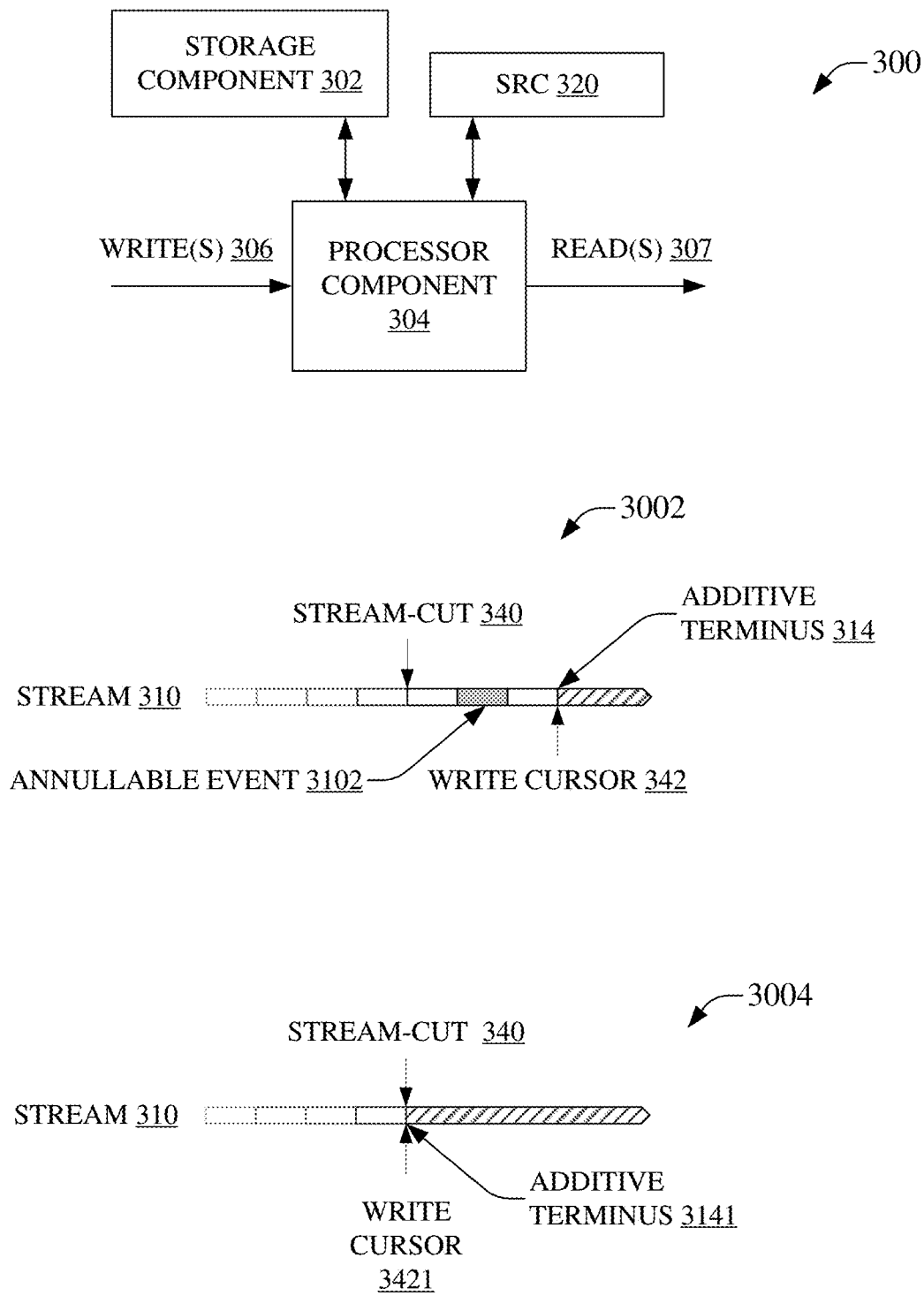
FIG. 3 illustrates an example system that can enable annulling storage of an event via lossy overwriting to a segment of an ordered event stream, in accordance with aspects of the subject disclosure.

FIG. 3 is an illustration of a system 300, which can facilitate annulling storage of an event via lossy overwriting to a segment of an ordered event stream, in accordance with aspects of the subject disclosure. System 300 can comprise a storage component 302 that can store an OES that can store one or more events according to a routing key that can be determined from aspects of the event. Events can be written to an OES in an ordered manner, e.g., via write(s) 306, and can be read from the OES in an ordered manner, e.g., via read(s) 307. In an aspect, keys of one or more segments of an OES can represent a key space. Segments can therefore act as logical containers associated with a particular range of keys for an event stream and can be used to store events within an OES. Ordered event stream system 300 can comprise segments. In an aspect, system 300 can store events according to segments, for example, as illustrated at 230 of FIG. 2.

A stream-cut event 340 can be employed by SRC 320 to facilitate movement of write cursor 342. As such, cut 340 can be applicable in some, none, or all segments of an OES stored via system 300, for example across segments 4, 5, 2, and 3 at cut 240 of FIG. 2, etc. As is illustrated at 3002, an example OES, e.g., stream 310, can comprise sequentially written events that can comprise annullable event 3102 between stream-cut 340 and write cursor 342. In an aspect, at 3002, write cursor 342 can be at additive terminus 314 of stream 310, wherein the hashed-fill portion of stream 310, to the right of the additive terminus 314, indicates a position of yet to be written events.

SRC 320 can move write cursor 342 to stream-cut 340. As such, stream 310, as illustrated at 3002, can be altered to that shown in 3004. As is illustrated at 3004, write cursor 342 can have been moved to stream-cut 340 and can now be illustrated as write cursor 3421. Accordingly, additive terminus 314 can have been updated to 3141 in 3004 and new events can be written therefrom, as is reflected by the hashed portion of stream 310 expanding to the left between 3002 and 3004. It can be appreciated that writing a new event at additive terminus 3141 can overwrite stream event(s) that are illustrated between stream-cut 340 and write cursor 342 of 3002. In an aspect, this can allow for overwriting of annullable event 3102. However, this can also result in overwriting of events other than annullable event 3102, e.g., the events immediately to the left and right of annullable event 3102 in 3002. This can be regarded as a 'lossy' annulment, e.g., the annulment can result in overwriting both annullable event 3102 and other events. Use of the stream cut event to move the write cursor and allow for overwriting of events of one or more segments of a stream can be a fast and effective manner of annulling inappropriate event(s) of a stream. However, this course annulling can also result in overwriting of events that are not inappropriate events, e.g., valid events. In some circumstances this can be acceptable. As an example, a client can indicate that overwriting valid events in annulling invalid events is acceptable within designated conditions. However, in some conditions, loss of valid events may be less acceptable. As such, mechanisms to preserve valid events that could otherwise be loss via overwriting indicated at 3004 can be desirable.

Figure 4:
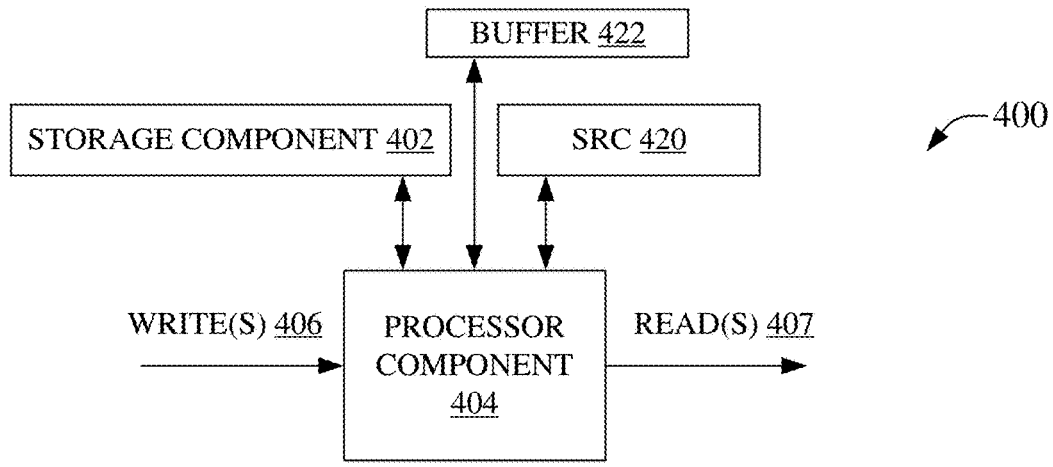
FIG. 4 is an illustration of an example system facilitating annulling storage of an event via lossless overwriting to a segment of an ordered event stream, in accordance with aspects of the subject disclosure.
Figure 4:
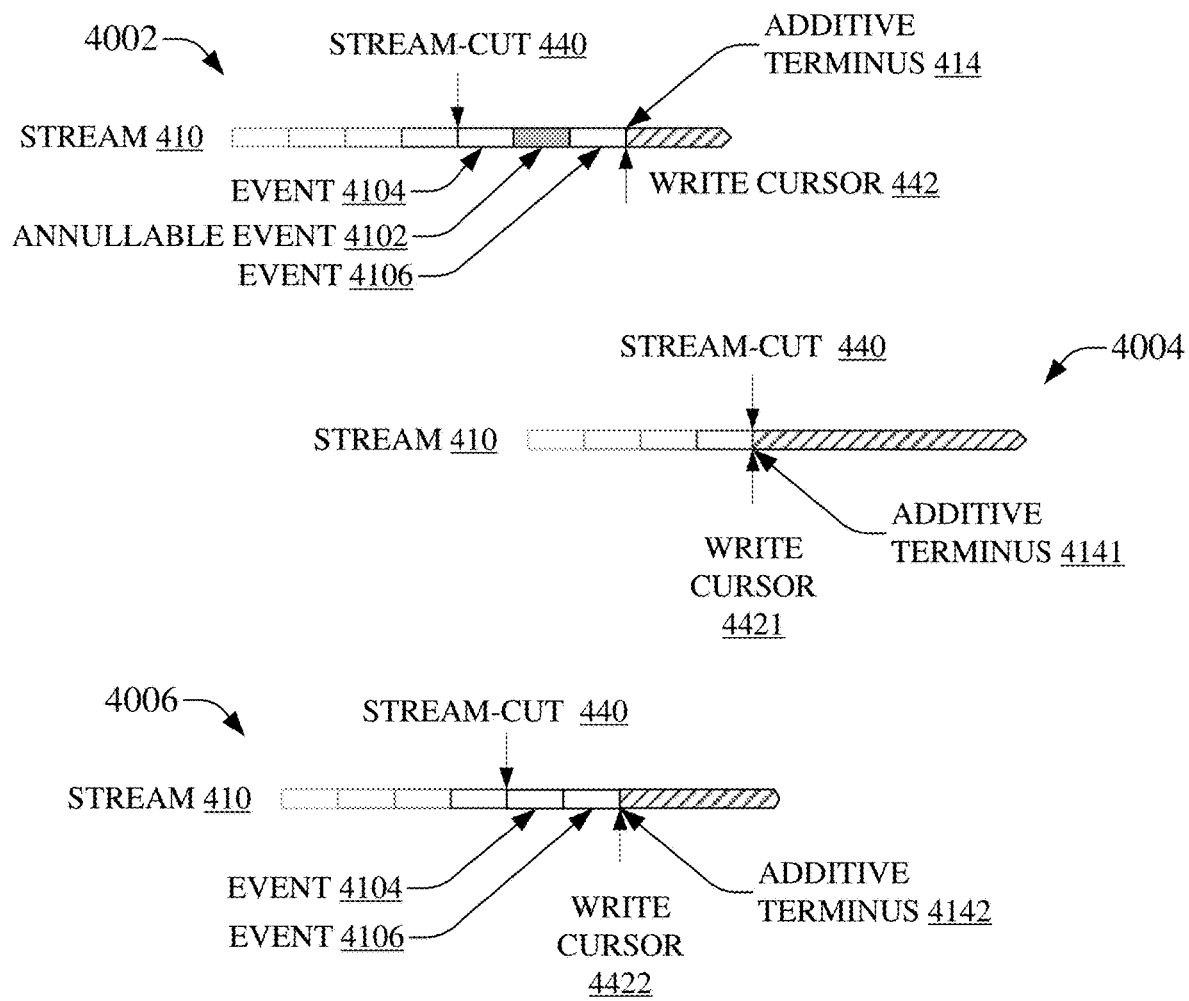

FIG. 4 is an illustration of an example system 400, which can enable annulling storage of an event via lossless overwriting to a segment of an ordered event stream, in accordance with aspects of the subject disclosure. System 400 can comprise storage component 402 that can store an OES that can store one or more events according to a routing key that can be determined from aspects of the event. Events can be written to an OES in an ordered manner, e.g., via write(s) 406, and can be read from the OES in an ordered manner, e.g., via read(s) 407. In an aspect, keys of one or more segments of an OES can represent a key space. Segments can therefore act as logical containers associated with a particular range of keys for an event stream and can be used to store events within an OES. Ordered event stream system 400 can comprise segments. In an aspect, system 400 can store events according to segments, for example, as illustrated at 230 of FIG. 2.

A stream-cut event 440 can be employed by SRC 420 to facilitate movement of write cursor 442. In an aspect, buffer 422 can facilitate preservation of valid events, e.g., event 4104, 4106, etc., despite overwriting of inappropriate events, e.g., annullable event 4102, etc., e.g., system 400 can be considered 'lossless' as compared to 'lossy' system 300. In an aspect, cut 440 can be applicable in some, none, or all segments of an OES stored via system 400, for example across segments 4, 5, 2, and 3 at cut 240 of FIG. 2, etc. As is illustrated at 4002, an example OES, e.g., stream 410, can comprise sequentially written events that can comprise annullable event 4102 and events 4104 and 4106 between stream-cut 440 and write cursor 442. In an aspect, at 4002, write cursor 442 can be at additive terminus 414 of stream 410, wherein the hashed-fill portion of stream 410, to the right of the additive terminus 414, indicates a position of yet to be written events.

SRC 420 can move write cursor 442 to stream-cut 440. As such, stream 410, as illustrated at 4002, can be altered to that shown in 4004, which can be the same as, or similar to that illustrated at 3004 of FIG. 3, wherein stream 410 at 4004 can comprise stream-cut 440 coincident with write cursor 4421 reflecting additive terminus 4141. In an aspect, rather than losing valid events, e.g., event 4104 and/or 4106, etc., events, e.g., 4104, 4102, 4106, etc., between stream-cut 440 and write cursor 442 in 4002 can be stored via buffer 422. The buffered events can then be determined to be appropriate, e.g., valid, or inappropriate. Valid events can be rewritten from additive terminus 4141, resulting in stream 410 at 4006 comprising events 4104 and 4106 between stream cut 440 and write cursor 4422, such that new events can be written from additive terminus 4142. In an aspect, 4006 can preserve event 4104 by determining that event 4104 is valid, then rewriting event 4104 to stream 410 at 4006. In an aspect, this can be via actual rewriting of event 4104, or can be by simply advancing write cursor 4421 to the boundary between 4104 and 4102, e.g., preserving event 4014 without actually necessitating rewriting. Analysis of annullable event 4012 from buffer 422 can then occur. Whereas annullable event 4102 can be inappropriate, advancing the write cursor does not occur such that determining event 4106 can result in overwriting event 4106 over annullable event 4016 and then advancing the write cursor to 4422 of 4006.

Figure 5:
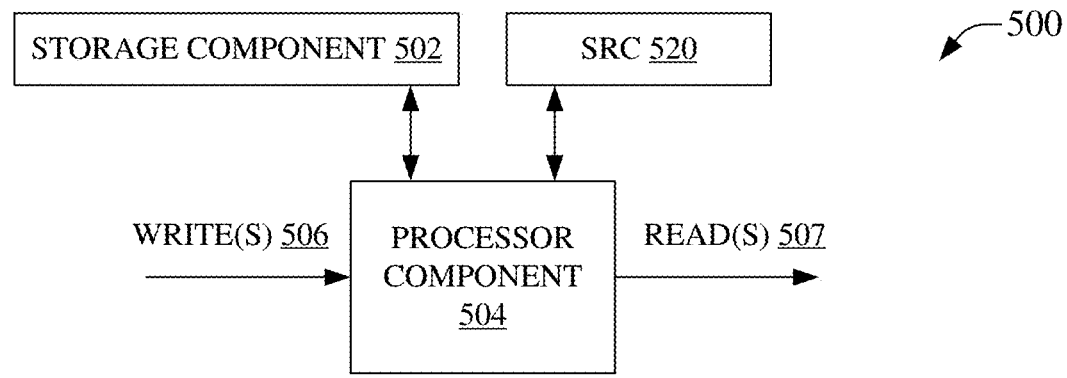
FIG. 5 is an illustration of an example system that can facilitate annulling storage of an event from a first tier of a tiered ordered event stream, wherein the first tier provides hot access to events of the tiered ordered event stream, in accordance with aspects of the subject disclosure.
Figure 5:
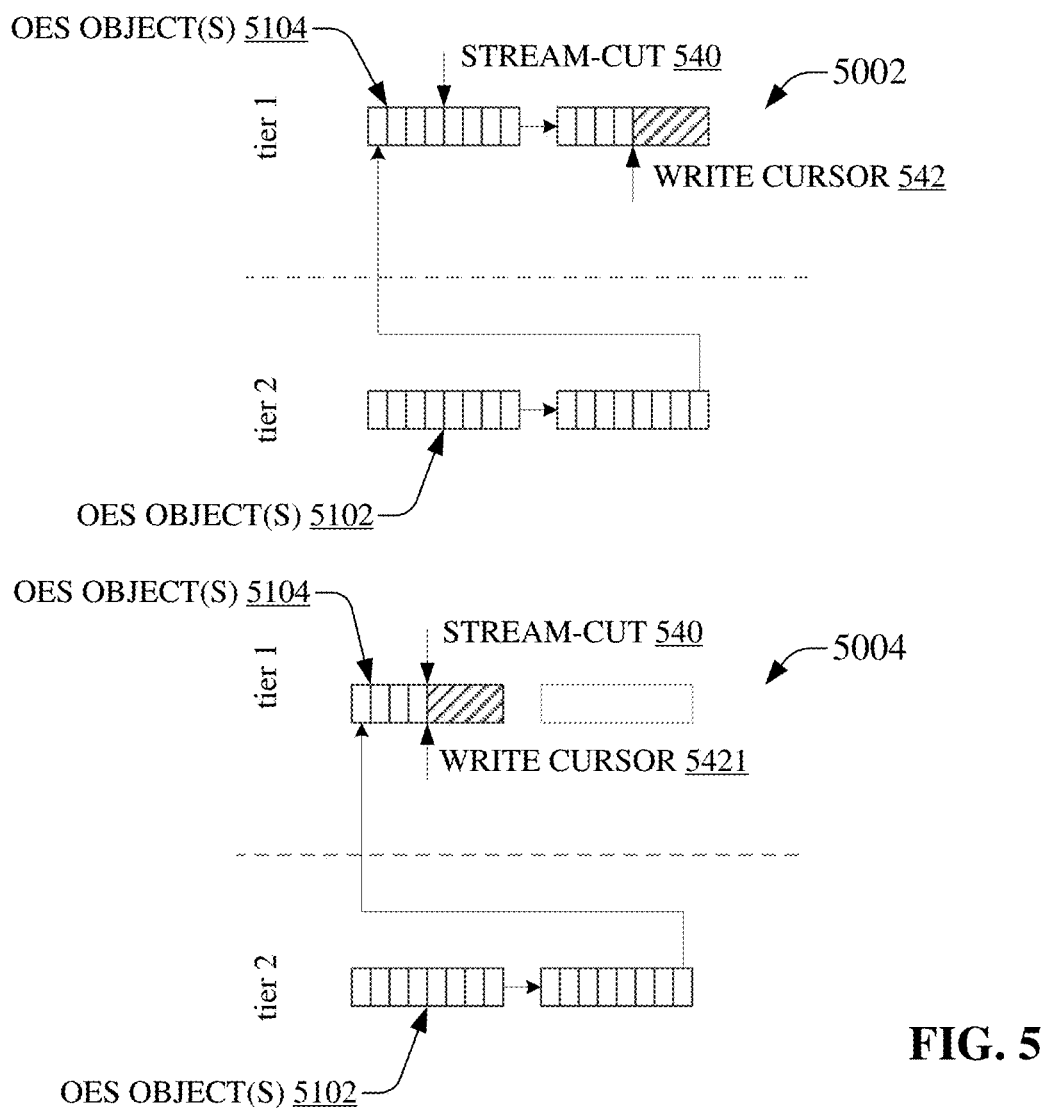

FIG. 5 is an illustration of a system 500 that can facilitate annulling storage of an event from a first tier of a tiered ordered event stream, in accordance with aspects of the subject disclosure. System 500 can comprise storage component 502 that can store an OES that can store one or more events according to a routing key that can be determined from aspects of the event. Events can be written to an OES in an ordered manner, e.g., via write(s) 506, and can be read from the OES in an ordered manner, e.g., via read(s) 507. In an aspect, keys of one or more segments of an OES can represent a key space. Segments can therefore act as logical containers associated with a particular range of keys for an event stream and can be used to store events within an OES. Ordered event stream system 500 can comprise segments. In an aspect, system 500 can store events according to segments, for example, as illustrated at 230 of FIG. 2. System 500 can comprise SRC 520 that can enable annulling event s of a stream that can store events via different tiers of storage.

In an aspect, stream storage can typically comprise newer events and older events. In an aspect, storing all events in a single type of storage can be undesirable. As an example, where a first type of storage can provide faster access than a second type of storage but can also be very costly per unit storage in comparison, it can be desirable to store frequently accessed events in the more expensive and faster storage and to store less frequently access events in slower and cheaper storage. Generally, this can be termed as hot storage and cold storage, e.g., hotter data can typically be associated with balancing performance/cost in favor of performance while colder data can be typically associated with balancing in favor of lower cost. Accordingly, OES storage systems, as disclosed herein, can generally be associated with a mix of storage tiers to provide different levels of a performance/cost balance. In an aspect, cost can be more nuanced that mere monetary cost of the storage element itself, for example, cost can be related to cost to operate the storage element, cost of the storage element, manpower needed to operate the storage element, cost of real estate consumed by the storage element, cost to upgrade the storage element, average failure rates of the storage element, heat generate by the storage element, or numerous other characteristics of the storage element that can be balanced against the desired level of performance for that tier of storage. In FIG. 5, only two tiers of storage are illustrated for clarity and brevity, although storage systems can comprise nearly any number of tiers without departing from the scope of the instant disclosure.

At 5002, a stream can store older events via OES object(s) 5102 of tier2 type storage and newer events via OES objects(s) 5104 of tier1 type storage. In an aspect, stream-cut 540 can indicate an event boundary in a first tier1 OES object and a write cursor 542 can indicate a later position in a second tier1 OES object. Accordingly, performing an event annulling operation can result in moving write cursor 542 from the position illustrated in 5002 to the position illustrated in 5004, e.g., as write cursor 5421. In an aspect, this can result in writing of new events occurring from write cursor 5421 of the example first tier1 OES object. Correspondingly, the tier2 storage can remain unchanged. As an example, where a stream writes events into NAND gates, e.g., tier1 is NAND gates, that can store 100 events, then events 'older' than 100 events can be offloaded to hard disk storage, e.g., tier2 is hard disk storage. In this example, where stream cut 540 indicates the 20th event, then the event annulling operation can cause overwriting of the last 20 events, which can all be stored via the NAND gates and, accordingly, events stored via the hard disks can remain unchanged. In an aspect, the overwriting illustrated in FIG. 5 can be lossy or lossless, as is disclosed elsewhere herein.

Figure 6:
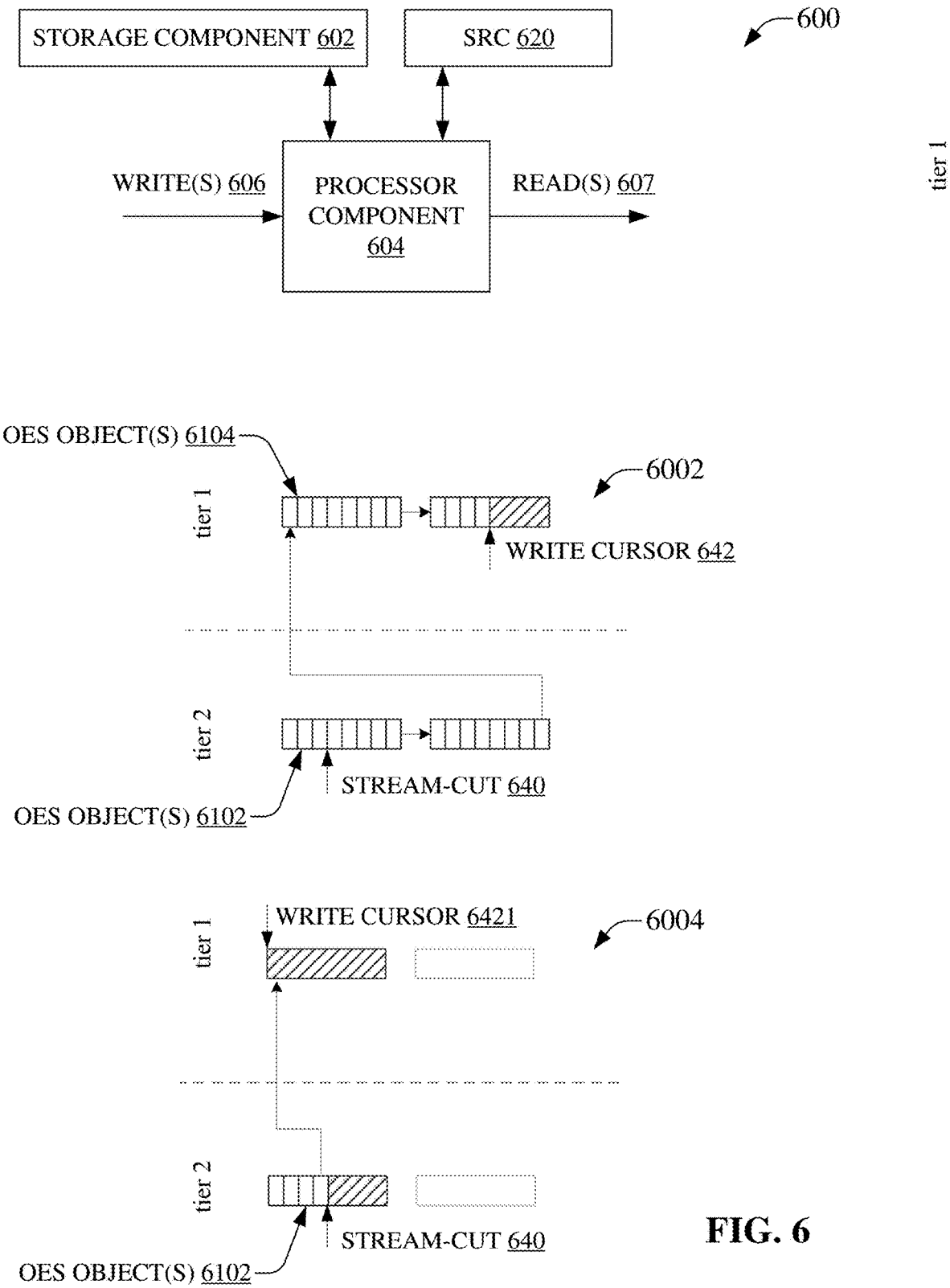
FIG. 6 is an illustration of an example system enabling annulling storage of an event from a second tier of a tiered ordered event stream, wherein a first tier provides hot access to events of the tiered ordered event stream, in accordance with aspects of the subject disclosure.

FIG. 6 is an illustration of a system 600 that can facilitate annulling storage of an event from a second tier of a tiered ordered event stream, wherein a first tier provides hot access to events of the tiered ordered event stream, in accordance with aspects of the subject disclosure. System 600 can comprise storage component 602 that can store an OES that can store one or more events according to a routing key that can be determined from aspects of the event. Events can be written to an OES in an ordered manner, e.g., via write(s) 606, and can be read from the OES in an ordered manner, e.g., via read(s) 607. In an aspect, keys of one or more segments of an OES can represent a key space. Segments can therefore act as logical containers associated with a particular range of keys for an event stream and can be used to store events within an OES. Ordered event stream system 600 can comprise segments. In an aspect, system 600 can store events according to segments, for example, as illustrated at 230 of FIG. 2. System 600 can comprise SRC 620 that can enable annulling event s of a stream that can store events via different tiers of storage.

As previously disclosed, stream storage can typically comprise newer events and older events that can be stored via tiers of storage having different costs and benefits. Generally, this can be termed as hot storage and cold storage, e.g., hotter data can typically be associated with balancing performance/cost in favor of performance while colder data can be typically be associated with balancing in favor of lower cost. OES storage systems, as disclosed herein, generally employ a mix of storage tiers to provide tailored balancing of cost and performance. In FIG. 6, only two tiers of storage are illustrated for clarity and brevity, although storage systems can comprise nearly any number of tiers without departing form the scope of the instant disclosure.

At 6002, a stream can store older events via OES object(s) 6102 of tier2 type storage and newer events via OES objects(s) 6104 of tier1 type storage. In an aspect, stream-cut 640 can indicate an event boundary in a tier2 OES object and a write cursor 642 can indicate a later position in a tier1 OES object, e.g., a portion of the stream between stream cut 640 and write cursor 642 can comprise events stored via both tier1 and tier2 types of storage.

In an embodiment, performing an event annulling operation can result in moving write cursor 642 from the position illustrated in 6002 to the position illustrated in 6004, e.g., as write cursor 6421. In an aspect, this can result in writing of new events occurring from write cursor 6421 of the example first tier1 OES object. In an aspect, the link between tier2 and tier1 storage can be updated, e.g., updating a mapping table, pointer, etc., to reflect that events after stream cut 640 in 6004 can occur from write cursor 6421, such that tier2 storage can be updated as illustrated. In an embodiment, write cursor 642 can be moved all the way to stream-cut 640 in 6004 tier2, however, many types of tier2 storage can make writing events into that type of storage difficult and so it can be preferable to not retreat write cursor 6421 into the tier2 storage. This can result in the waste of some tier2 OES object(s) 6102 space, but this can generally be recovered via garbage collection processes that can occur over the life of the OES storage system and that can be germane to, but otherwise typically be unrelated to event annulment operations. In an aspect, the overwriting illustrated in FIG. 6 can be lossy or lossless, as is disclosed elsewhere herein.

Figure 7:
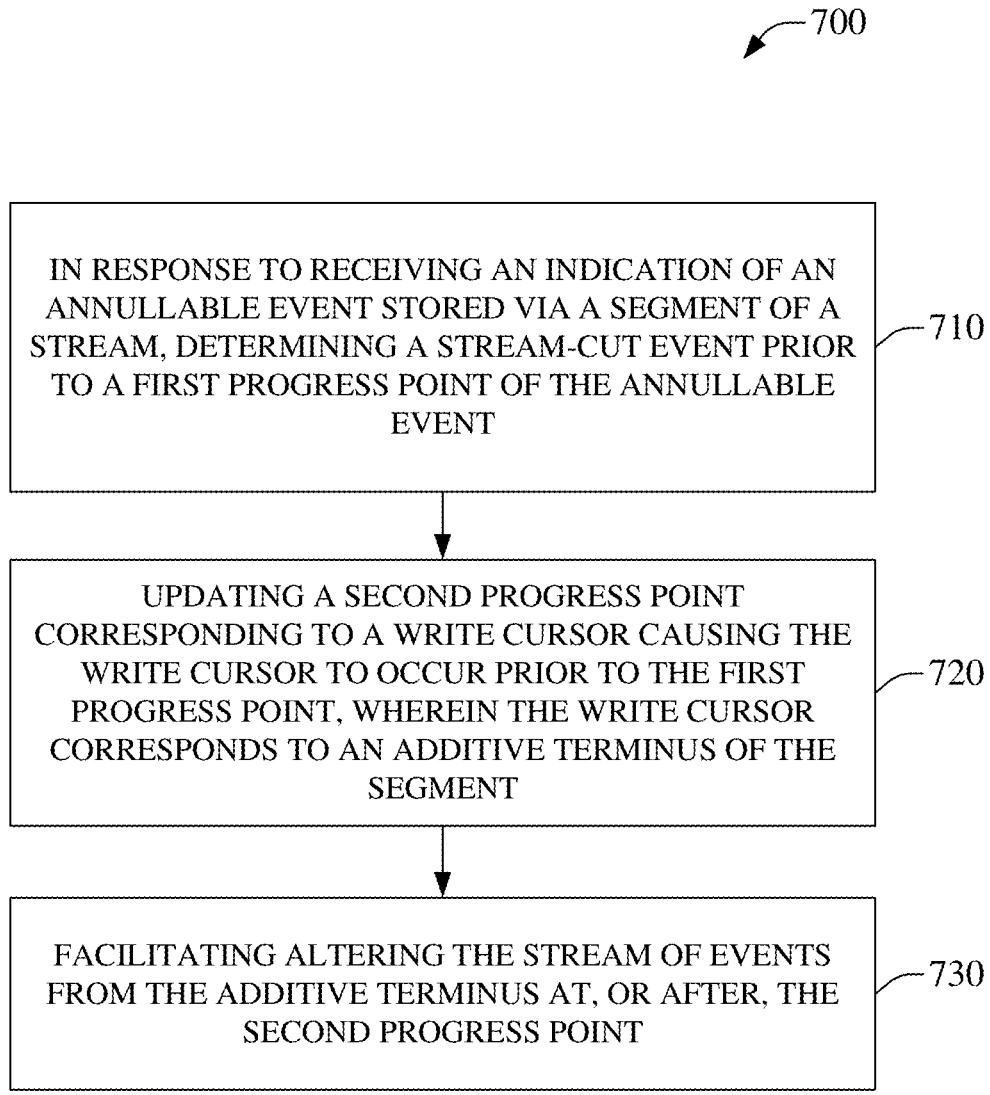
FIG. 7 is an illustration of an example method facilitating annulling storage of an event in an ordered event stream, in accordance with aspects of the subject disclosure.
Figure 8:
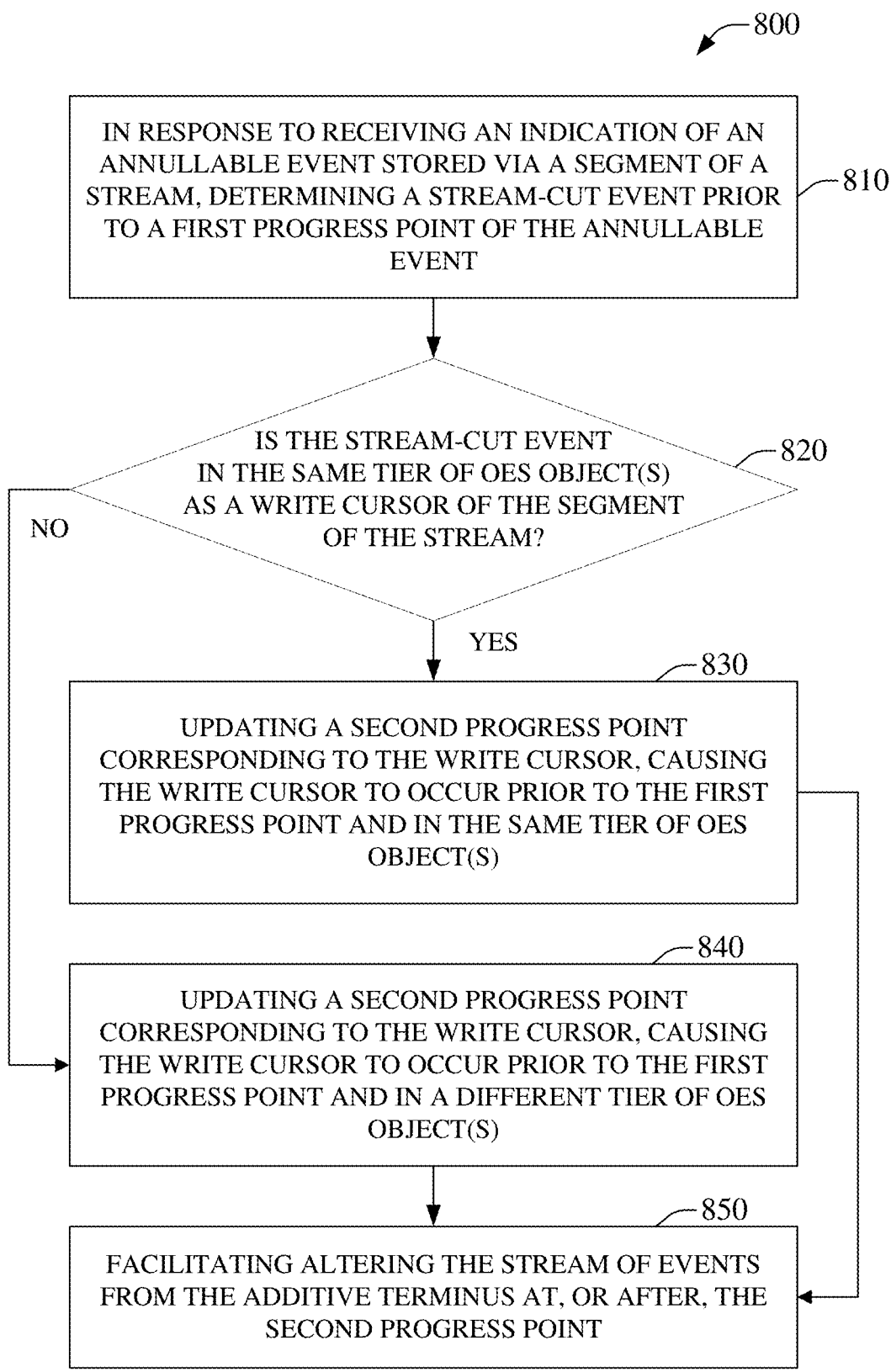
FIG. 8 is an illustration of an example method facilitating annulling storage of an event in a tiered ordered event stream, wherein a first tier of the tiered ordered event stream supports faster access to events of the tiered ordered event stream than a second tier of the tiered ordered event stream, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700 that can facilitate annulling storage of an event in an ordered event stream, in accordance with aspects of the subject disclosure. At 710, method 700 can comprise receiving an indication of an annullable event stored via a segment of a stream and, in response, determining an occurrence of a stream-cut event prior to a first progress point of the annullable event. An annullable event can be an event that is unacceptable for storage via the stream, e.g., an inappropriate event. In an aspect, it can be desirable to annul the event, for example by overwriting the event to remove it from the stream. In an aspect, overwriting an entire stream can be computing resource inefficient. Additionally, adding new mitigating events can result in an overly complicated and unnecessarily lengthy stream. Accordingly, by determining an occurrence of a stream-cut event, a portion of one or more segments of a stream can be updated to annul the writing of an inappropriate event on a scale that can be less than an entire stream.

The stream-cut event can occur at an earlier progress point in the stream than the event to be annulled. In an aspect, where there can be more than one earlier stream-cut event, a stream-cut event immediately preceding the event to be annulled can be selected. As an example, if the annullable event is the 1865th event in the stream and stream-cut events are automatically generated every 250 events, then the immediately preceding stream-cut event can be at the 1750th event boundary. In this example, rewriting events from 1751st event can annul the 1865th event.

Method 700, at 720, can therefore comprise updating a second progress point corresponding to a write cursor causing the write cursor to occur prior to the first progress point, wherein the write cursor corresponds to an additive terminus of the segment. Typically in an OES the additive terminus can be where a next event will be written, e.g., the write cursor of the stream can occur at the additive terminus. The write cursor can be moved to point at a progress point before the first progress point corresponding to the event to be annulled. In embodiments, the write cursor can be altered to point to the stream-cut. It is noted that the stream cut is not consumed in the process of pointing a write cursor at it, e.g., the stream-cut event can persist. Returning to the prior example, the write cursor can be pointed at the 1750th event boundary corresponding to the example immediately preceding stream-cut event.

At 730, method 700 can comprise facilitating altering the stream of events from the additive terminus at, or after, the second progress point. At this point method 700 can end. In an aspect, the stream can be altered by writing events at the updated write cursor. In an aspect, similar to FIG. 3, new events can be written from the update write cursor, e.g., a lossy annulment of the stream segment. In another aspect, similar to FIG. 4, previous events, e.g., valid events of the stream segment prior to the updating of the write cursor, etc., can be rewritten to the segment of the stream in a lossless annulment of the stream segment. In an aspect, events can be read to a buffer and then be rewritten. In another aspect, events can be read, and where they are determined to be valid, the write cursor can be advanced to effectively keep the valid event in the stream without actually rewriting the event, e.g., the valid event can be left in place. In regard to this aspect, a valid event occurring after an inappropriate event can generally be read to a buffer and rewritten to overwrite the inappropriate event, e.g., shifting valid events to overwrite inappropriate events, for example, as illustrated at 4006 of FIG. 4, etc.

FIG. 8 is an illustration of an example method 800, which can enable annulling storage of an event in a tiered ordered event stream, wherein a first tier of the tiered ordered event stream supports faster access to events of the tiered ordered event stream than a second tier of the tiered ordered event stream, in accordance with aspects of the subject disclosure. At 810, method 800 can comprise determining an occurrence of a stream-cut event prior to a first progress point of an annullable event in response to receiving an indication of the annullable event that can be stored via a segment of a stream. An annullable event can be an event that is unacceptable for storage via the stream, e.g., an inappropriate event. In an aspect, it can be desirable to annul the event, for example by overwriting the event to remove it from the stream. In an aspect, a portion of one or more segments of a stream can be updated to annul the writing of an inappropriate event on a scale that can be less than an entire stream. The stream-cut event can occur at an earlier progress point in the stream than the event to be annulled. In an aspect, where there can be more than one earlier stream-cut event, a stream-cut event immediately preceding the event to be annulled can be selected.

At 820, method 800 can comprise determining if the stream-cut event is in the same tier of OES object(s) as a write cursor of the segment of the stream. Where the stream-cut event is in the same tier of OES object(s), method 800 can advance to 830, where it is not in the same tier, method 800 can advance to 840. A stream can typically comprise newer events and older events that can be regarded as being hotter or cooler, for example depending on frequency of access to events. In an aspect, storing all events in a single type of storage can be undesirable. Accordingly, OES storage systems, as disclosed herein, can generally be associated with a mix of storage tiers to provide different levels of a performance/cost balance. In an aspect, cost can be more nuanced that mere monetary cost of the storage element itself, for example, cost can be related to cost to operate the storage element, cost of the storage element, manpower needed to operate the storage element, cost of real estate consumed by the storage element, cost to upgrade the storage element, average failure rates of the storage element, heat generate by the storage element, or numerous other characteristics of the storage element that can be balanced against the desired level of performance for that tier of storage. As an example, where a first type of storage cam provide faster access than a second type of storage but can also be very costly per unit storage in comparison, it can be desirable to store frequently accessed events in the more expensive and faster storage and to store less frequently access events in slower and cheaper storage. Generally, this can be termed as hot storage and cold storage, e.g., hotter data can typically be associated with balancing performance/cost in favor of performance while colder data can be typically be associated with balancing in favor of lower cost. In a first example, applying method 800 in FIG. 5 can result in a 'yes' that can then advance method 800 to 830. In a second example, applying method 800 in FIG. 6 can result in a 'no' that can then advance method 800 to 840.

Method 800, at 830, can comprise updating a second progress point corresponding to a write cursor causing the write cursor to occur prior to the first progress point and in the same tier of OES object(s). The write cursor of the stream can occur at an additive terminus. The write cursor can be moved to point at a progress point before the first progress point corresponding to the event to be annulled and also in the same tier of OES object(s). In embodiments, the write cursor can be altered to point to the stream-cut. It is noted that the stream cut is not consumed in the process of pointing a write cursor at it, e.g., the stream-cut event can persist. As an example, in FIG. 5, stream-cut event 540 and write cursor 542 can occur in the same tier of OES object(s) 5104 at 5002. In this example, 820 can return a 'yes' and at 830, write cursor 542 can be altered to point to stream-cut event 540 as write cursor 5421 at 5004. Method 800 can then advance to 850.

At 840, method 800 can comprise updating a second progress point corresponding to a write cursor causing the write cursor to occur prior to the first progress point and in a different tier of OES object(s). As at 830, the write cursor can be moved to point at a progress point before the first progress point corresponding to the event to be annulled, however, the write cursor can also point to a different tier of OES object(s). As an example, in FIG. 6, stream-cut event 640 and write cursor 642 can occur in different tiers of OES object(s), e.g., 6102 and 6104. In this example, 820 can return a 'no' and at 840, write cursor 642 can be altered to point to stream-cut event 640 as write cursor 6421 at 6004. It is noted that write cursor 6421 occurs at the intersection between tier1 and tier2 in 6004, which can be a same position as stream-cut event 640 due to the logical transition between the two tiers, e.g., the last event of tier2 at stream-cut event 640 transitions directly to the first event of tier1 at write cursor 6421. In some embodiments, it can be possible to write events into tier2 storage, however, generally, where tier1 can store hotter events, some waste of tier2 storage is acceptable and events can be written to tier1 storage.

At 850, method 800 can comprise facilitating altering the stream of events from the additive terminus at, or after, the second progress point. At this point method 800 can end. In an aspect, the stream can be altered by writing events at the updated write cursor. In an aspect, similar to FIG. 3, new events can be written from the update write cursor, e.g., a lossy annulment of the stream segment. In another aspect, similar to FIG. 4, previous events, e.g., valid events of the stream segment prior to the updating of the write cursor, etc., can be rewritten to the segment of the stream in a lossless annulment of the stream segment. In an aspect, events can be read to a buffer and then be rewritten. In another aspect, events can be read, and where they are determined to be valid, the write cursor can be advanced to effectively keep the valid event in the stream without actually rewriting the event, e.g., the valid event can be left in place. In regard to this aspect, a valid event occurring after an inappropriate event can generally be read to a buffer and rewritten to overwrite the inappropriate event, e.g., shifting valid events to overwrite inappropriate events, for example, as illustrated at 4006 of FIG. 4, etc.

Figure 9:
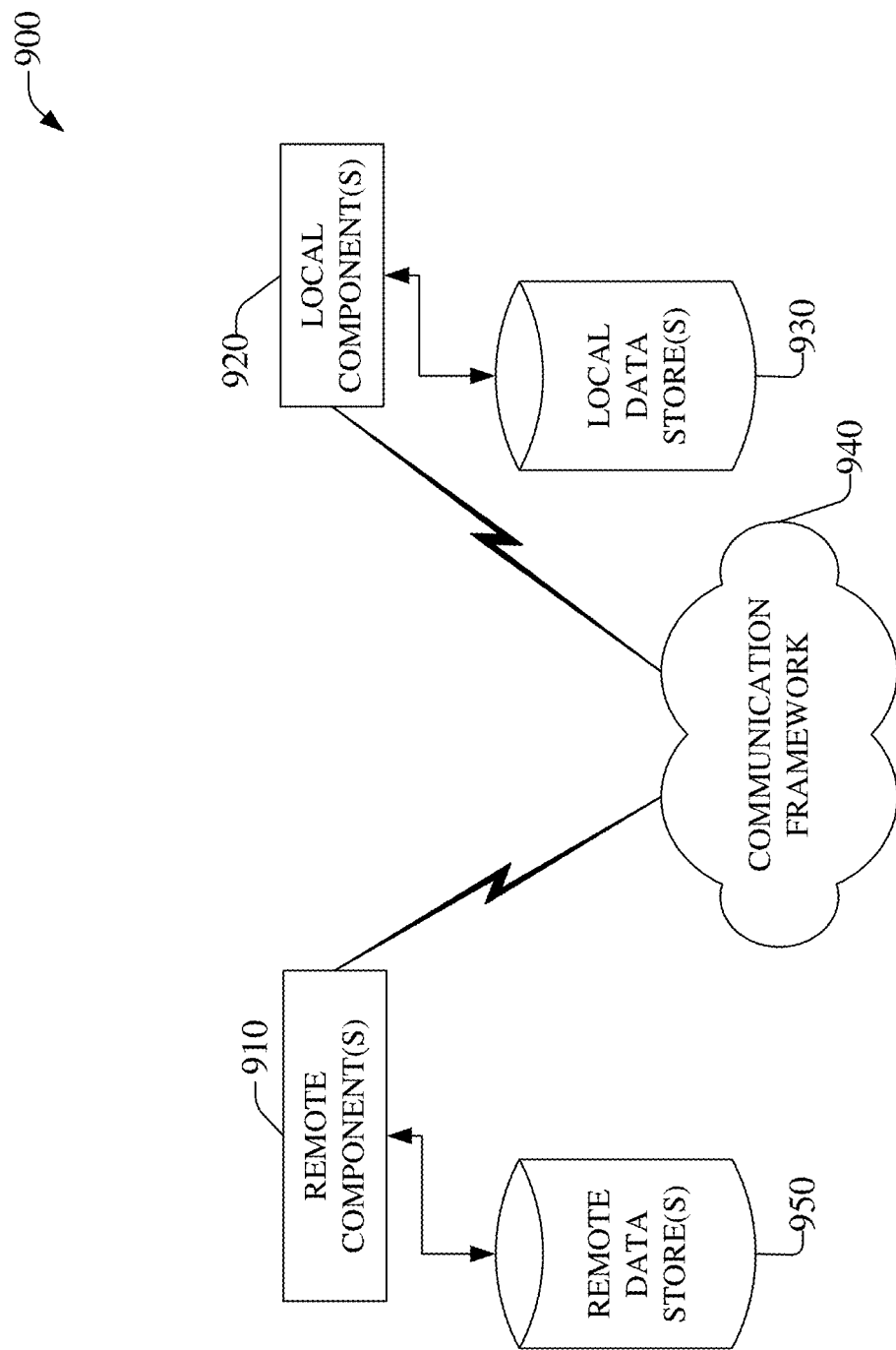
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102-602, etc., a remotely located processor device comprised in processor component 104-604, etc., a remotely located device comprised in stream restoration component 120-620, etc., or other remotely located devices, which can be connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102-602, etc., a locally located processor device comprised in processor component 104-604, etc., a locally located device comprised in stream restoration component 120-620, etc., or other locally located devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, writing, reading, erasing, expiring, caching, framing, annulling, etc., of events of segments of an OES(s) in systems 100-600, etc., can be communicated via communication framework 940 among storage components of an OES storage network 100-600, etc., e.g., to facilitate adapting, altering, modifying, erasing, deleting, freeing, caching, framing, annulling, etc., events stored via one or more OES(s), as disclosed herein.

Figure 10:
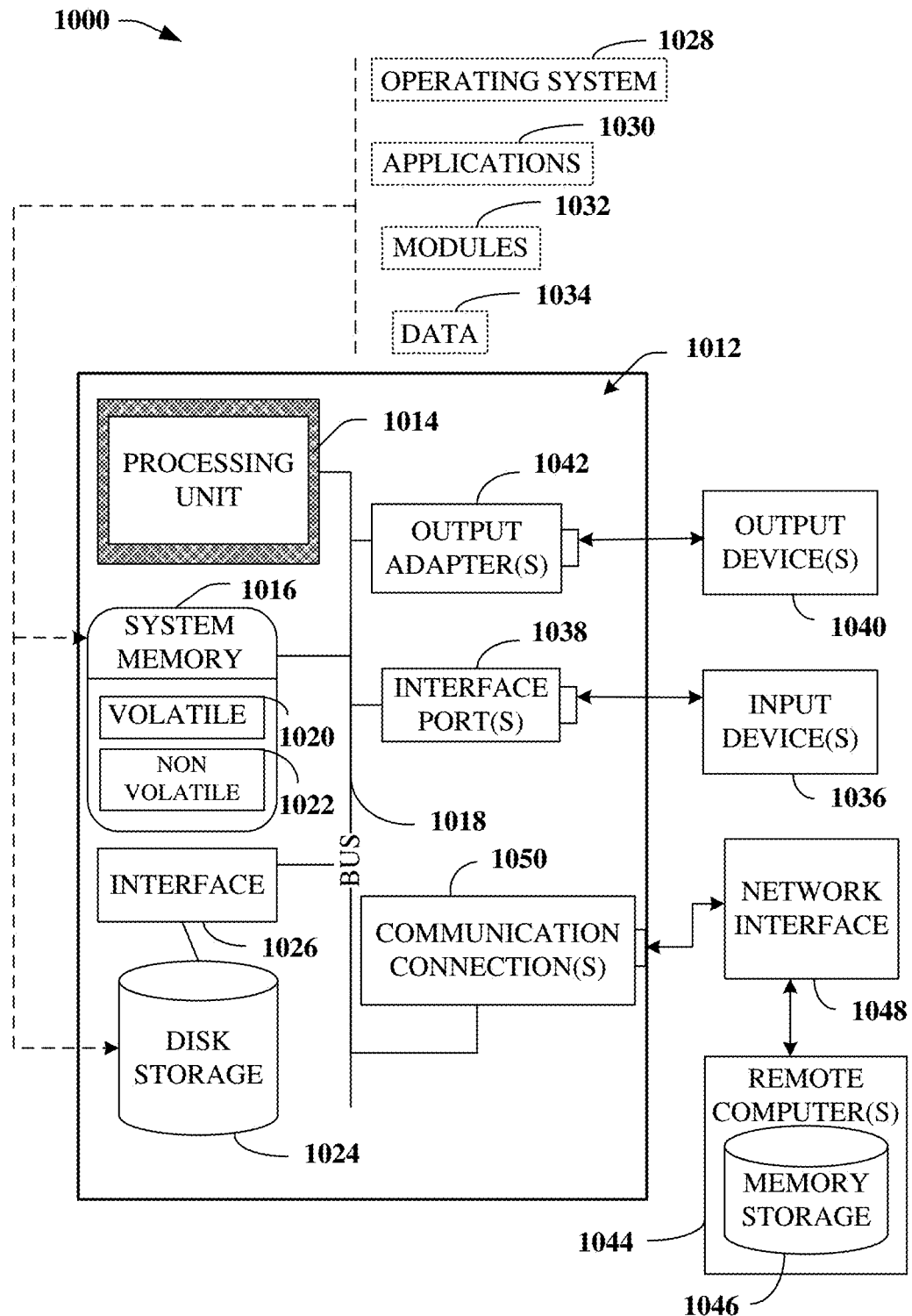
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102-602, processor component 104-604, EFC 120-620, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining a first progress point of an event, determining a second progress point of a stream-cut occurring earlier than the first progress point, and annulling the segment from a third progress point resulting from updating a write cursor to a third progress point that is an earlier progress point than the first progress point.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
   determining a first progress point of an event of events stored via a segment of an ordered event stream;
   determining a second progress point of a stream-cut event, wherein the stream-cut event indicates a progress point in more than one parallel segment of the ordered event stream, wherein the stream-cut event is generated based on a determinable input value, wherein respective segments of the ordered event stream are associated with respective processing instances, as a result of which increasing a number of segments in the ordered event stream allows additional processing instances to be engaged, which increases a key space associated with the ordered event stream, and wherein the key space is symmetrically or asymmetrically divided into respective ranges corresponding to the respective segments of the ordered event stream;
   updating a write cursor to a third progress point, wherein the second progress point and the third progress point are respective earlier progress points than the first progress point; and
   facilitating altering the ordered event stream by altering at least one of the events occurring from the third progress point, wherein the altering comprises annulment of the at least one of the events, and wherein the at least one of the events is of a first type of storage that balances performance and cost of storing the events in favor of increasing the performance or of a second type of storage that balances the performance and the cost of storing the events in favor of reducing the cost.

2. The system of claim 1, wherein the updating the write cursor to the third progress point results in the write cursor being updated to the second progress point.

3. The system of claim 1, wherein the more than one parallel segment of the ordered event stream comprises the segment storing the events.

4. The system of claim 1, wherein the stream-cut event indicates the second progress point in a first ordered event storage system storage component tier, and wherein the write cursor, prior to the updating the write cursor, indicates another progress point in the first ordered event storage system storage component tier.

5. The system of claim 1, wherein the stream-cut event indicates the second progress point in a second ordered event storage system storage component tier, wherein the write cursor, prior to the updating the write cursor, indicates another progress point in a first ordered event storage system storage component tier, and wherein the first ordered event storage system storage component tier is a different tier than the second ordered event storage system storage component tier.

6. The system of claim 5, wherein the updating the write cursor results in the write cursor being updated to the third progress point in the first ordered event storage system storage component tier, and wherein the second ordered event storage system storage component tier remains unchanged.

7. The system of claim 5, wherein the updating the write cursor results in the write cursor being updated to the third progress point in the first ordered event storage system storage component tier, and wherein the second ordered event storage system storage component tier is updated.

8. The system of claim 1, wherein the facilitating the altering the ordered event stream comprises writing new events from the third progress point.

9. The system of claim 1, wherein the facilitating the altering the ordered event stream comprises rewriting old events from the third progress point.

10. The system of claim 9, wherein the rewriting the old events comprises buffering the old events, determining that an old event of the old events satisfies a rule relating to event validity, and rewriting the old event to the ordered event stream from the third progress point.

11. The system of claim 9, wherein the rewriting the old events comprises determining that an old event of the old events satisfies a rule relating to event validity and advancing the write cursor to a next event from the third progress point.

12. A method, comprising:
receiving, by system comprising a processor, a first progress point of an event of events stored via a segment of an ordered event stream of an ordered event stream storage system, wherein the ordered event stream storage system is associated with a first type of storage that balances performance and cost of storing the events by weighting the performance greater than the cost and a second type of storage that balances the performance and the cost of storing the events by weighting the cost greater than the performance;
determining, by the system, a second progress point of a stream-cut event, wherein the stream-cut event indicates at least one progress point in at least one segment of the ordered event stream, wherein the stream-cut event is generated based on a determinable input value, wherein respective segments of the ordered event stream are associated with respective processing instances, wherein increasing a number of segments in the ordered event stream allows additional processing instances to be engaged, which increases a key space associated with the ordered event stream, and wherein the key space is symmetrically divided into respective ranges corresponding to the at least one segment and one or more additional segments of the ordered event stream;

pointing, by the system, a write cursor to a third progress point, wherein the second progress point and the third progress point are respective earlier progress points than the first progress point, resulting in an updated write cursor; and overwriting, by the system, from the third progress point, the ordered event stream, resulting in at least one inappropriate event occurring from the third progress point being annulled.

13. The method of claim 12, wherein the pointing the write cursor comprises the third progress point being a same progress point as the second progress point.

14. The method of claim 12, wherein the pointing the write cursor is based on the write cursor indicating a progress point in a first storage tier of the ordered event stream storage system, the second progress point of the stream-cut event being in a second storage tier of the ordered event stream storage system, and the first storage tier and the second storage tier being different storage tiers of the ordered event stream storage system.

15. The method of claim 12, wherein the pointing the write cursor is based on the write cursor indicating a progress point in a first storage tier of the ordered event stream storage system, the second progress point of the stream-cut event being in a second storage tier of the ordered event stream storage system, and the first storage tier and the second storage tier being a same storage tier of the ordered event stream storage system.

16. The method of claim 12, wherein the overwriting results in lossy annulment for the event.

17. The method of claim 12, wherein the overwriting results in lossless annulment for the event.

18. A non-transitory machine-readable medium, comprising executable instructions that, when executed by a processor, facilitate performance of operations, comprising:

determining a first progress point of an event stored via a segment of an ordered event stream of an ordered event stream storage system, wherein the ordered event stream storage system is associated with a first type of storage that balances performance and cost of storing the event in favor of enhancing the performance and a second type of storage that balances the performance and the cost of storing the event in favor of reducing the cost;

determining a second progress point of a stream-cut event, wherein the stream-cut event indicates one or more progress points in one or more segments of the ordered event stream, wherein the stream-cut event is generated based on a determinable input value, wherein respective segments of the ordered event stream are associated with respective processing instances such that increasing a number of segments in the ordered event stream allows additional processing instances to be engaged, which increases a key space associated with the ordered event stream, and wherein the key space is asymmetrically divided into respective ranges corresponding to at least two segments of the ordered event stream; and in response to updating a write cursor to a third progress point, wherein the second progress point and the third progress point are respective earlier progress points than the first progress point, resulting in an updated write cursor, annulling the segment from the third progress point, resulting in one or more invalid events occurring from the third progress point being annulled.

19. The non-transitory machine-readable medium of claim 18, wherein the annulling is a lossy annulling of the segment.

20. The non-transitory machine-readable medium of claim 18, wherein the annulling is a lossless annulling of the segment.

* * * * *